United States Patent [19]

Goodman

[11] 4,164,521

[45] Aug. 14, 1979

[54] MIXTURES OF POLYCATIONIC AND POLYANIONIC POLYMERS FOR SCALE CONTROL

[75] Inventor: Richard M. Goodman, Norwalk, Conn.

[73] Assignee: American Cyanamid Company, Stamford, Conn.

[21] Appl. No.: 766,329

[22] Filed: Feb. 7, 1977

[51] Int. Cl.$^2$ .............................................. C08L 33/02
[52] U.S. Cl. .................................. 525/187; 210/37 R; 210/58; 252/180; 260/29.2 EP; 528/405
[58] Field of Search ............... 260/87 4, 29.2 EP, 898; 252/180, 86, 82; 210/37 A, 58; 528/405

[56] References Cited

U.S. PATENT DOCUMENTS

| 3,463,730 | 8/1969 | Booth et al. ............................ 210/58 |
| 3,565,973 | 2/1971 | Michaels ............................... 260/874 |
| 3,660,338 | 5/1972 | Economou .................... 260/29.6 NR |
| 3,738,945 | 6/1973 | Panzer et al. ...................... 260/2 BP |
| 3,929,750 | 12/1975 | Eishun et al. ........................ 260/874 |
| 3,985,671 | 10/1976 | Clark ..................................... 252/180 |

*Primary Examiner*—Carman J. Seccuro
*Attorney, Agent, or Firm*—W. J. van Loo; F. M. Van Riet

[57] ABSTRACT

Certain mixtures of polyanionic and polycationic polymers are effective inhibitors of magnesium hydroxide scale formation in evaporative desalination units.

7 Claims, No Drawings

MIXTURES OF POLYCATIONIC AND POLYANIONIC POLYMERS FOR SCALE CONTROL

This invention relates to a composition useful for reducing scaling associated with evaporation desalination units. More particularly, this invention relates to such a composition comprising a combination of certain polyanionic polymers and certain polycationic polymers, the combination being soluble in water at use levels without precipitation.

Desalination is a process for removing soluble salts from water containing them to render such water potable or useful in operations where the original dissolved salt content is unacceptable. Desalination is an important process for providing potable water from sea water in arid areas where other sources of water are limited. Desalination is also an important process for removing salts from waste waters so that such waters can be recycled to processing or safely discharged into natural waters.

Desalination may be an evaporative process carried out in desalination units that may be operated under vacuum, at atmospheric pressure, or at superatmospheric pressure. The use of vacuum or superatmospheric pressures are more difficult and costly and employ in conjunction with desalination units and, accordingly, the preferred procedure of operation is essentially at atmospheric pressure. In operating such desalination units, the temperature of operation, which is dependent upon the operating pressure employed, influences the nature of scaling that occurs. At atmospheric pressure, a transition point occurs at a temperature between about 80° C. and about 90° C., below which the scale formation is due to calcium carbonate and above which the scale formation is due to magnesium hydroxide. While scale formation due to calcium carbonate can be controlled by a number of useful additives, the problem of magnesiu, hydroxide scale or sludge control in evaporation desalination units has not been satisfactorily solved. Thus, although evaporative desalination units are potentially efficient in the desalination of sea waters and waters of high salt contents, the rapid formation of magnesium scaling or sludging reduces efficiency, necessitating shut-down and scale or sludge removal from the desalination units. The loss of operating time and the difficulties of scale or sludge removal severely limit the amount of water processed by a desalination unit in a given time period and add to the cost of processed water.

A number of methods have previously been proposed for decreasing deposition of scale from sea water onto metal surfaces and involve the use of certain chelating agents. One such method involves addition of polyphosphate-ligno-sulfonate mixtures, such as described in U.S. Pat. No. 2,782,162 to Lidell. However, these mixtures are not effective in saline waters at high temperatures and result in calcium phosphate sludge.

Also, certain polyelectrolytes, such as sodium polyacrylate, are effective in preventing calcium carbonate scale at high temperatures, see South African Patent Application No. 680,947, but are ineffective against magnesium scales, as shown herein.

U.S. Pat. No. 3,981,779 to Block teaches use of a chelate surfactant selected from N-lauryliminodiacetic acid, N-oleyliminodiacetic acid, oleoyliminodiacetic acid and their ammonium and alkali metal salts. While these agents do decrease magnesium hydroxide scale deposition to some extent, the extent of decrease is marginal.

U.S. Pat. No. 3,985,671 to Clark, teaches use of a blend of a polyaminoalkylene phosphate and a polyquaternary ammonium chloride as a scale control agent for recirculating water cooling equipment. The combination is shown to be effective in extending the saturation point of calcium carbonate, but no information is given as to its effectiveness in preventing magnesium hydroxide scaling. However, such combination is found upon evaluation to be ineffective in preventing magnesium hydroxide scaling to any desirable extent.

There exists, therefore, the need for a composition which when added to the saline water being processed in evaporative desalination units would reduce significantly the rate at which scale and sludge formation occurs therein. Such a provision would fulfill a long-felt need and result in a significant advance in the art.

In accordance with the present invention, there is provided a magnesium scale inhibiting composition comprising (1) a polyanionic polymer containing at least about 50 mole percent of repeating units derived from an acrylic acid and any balance of repeating units derived from one or more monomers compatible therewith, the acid units being in the form of at least one member selected from the group consisting of free acid radical, ammonium salt, and alkali metal salts, and (2) a polycationic polymer selected from the group consisting of (a) dimethylamine-polyamine-epichlorohydrin reaction product wherein the amount of said polyamine is from 0 to about 15 mole percent of the total amine content and the amount of said epichlorohydrin is from at least the molar equivalent of the total amine content up to the full functional equivalent of said amine content, (b) poly (dimethyldiallylammonium chloride), (c) quaternarized derivatives of poly(dimethylaminoethylmethacrylate), and (d) poly [oxyethylene(dimethylimino)ethylene(dimethylimino)ethylene dichloride), said polyanionic polymer having a molecular weight in the range of about 500 and about 50,000 said polycationic polymer having a molecular weight in the range of about 1,500 and about 500,000, and the molar ratio of said polycationic polymer to said polyanionic polymer based on the average molecular weight of repeating units therein being in the range of about 2:1 and about 25:1.

Use of the scale inhibiting composition of the present invention in evaporative desalination units in which sea water is being processed enables such units to be operated for greatly extended time periods at high efficiency. This result is highly surprising and completely unexpected in view of the fact that the polyanionic polymer is ineffective in the inhibition of magnesium floc formation when used alone and the polycationic polymer is completely ineffective as an anti-scaling agent when used alone. In addition to its ability to inhibit magnesium hydroxide scale or sludge formation, the composition of the present invention is also effective against calcium carbonate scaling, thus providing protection against scale formation at a wide range of operating temperatures.

The polyanionic polymer of the scale inhibiting composition of the present invention is a polymer containing at least about 50 mole percent of repeating units derived from an acrylic acid and any balance of repeating units derived from one or more monomers compatible therewith, the acid units being in the form of at least one member selected from the group consisting of free acid radical, ammonium salt, and alkali metal salts and the molecular weight of the polymer being in the range of about 500 and about 50,000, preferably about 1,000 to 20,000.

By "an acrylic acid" is meant a carboxylic acid containing a mono-ethylenically unsaturated group capable of free-radical polymerization and having a structure related to acrylic acid. Suitable acids include acrylic acid, methacrylic acid, tiglic acid, angelic acid, crotonic acid, isocrotonic acid, and the like. Such acids all have the basic acrylic acid structure except that certain hydrogen atoms of the basic acrylic acid structure are replaced by alkyl, preferably methyl, groups. A preferred acid is acrylic acid.

By the expression "monomers compatible with" is meant those monomers which, when providing repeating units in the polyanionic polymer, provide units in amounts which do not interfere with the function of the acid group present or adversely affect the solubility of the resulting polymer. Suitable compatible monomers include acrylamide, methacrylamide, acrylonitrile, methacrylonitrile, vinyl acetate, methyl, vinyl ether, and the like. The polyanionic polymer may be prepared by conventional polymerization procedures using the selected monomer content or may be obtained by hydrolysis or suitable polymers containing such starting monomers as will provide the desired hydrolysis product following conventional procedures. Useful polyanionic polymers are those described in U.S. Pat. No. 3,463,730 issued to Booth et al. on Aug. 26, 1969, although other polymers, as defined, are also useful.

The polycationic polymer may be any of four types. A first type is generally described in U.S. Pat. No. 3,738,945 issued to Panzer et al. on June 12, 1973, except that in the present invention the secondary amine is dimethylamine and the epoxy compound is epichlorohydrin or precursors thereof. Such a polycationic polymer is the reaction product od dimethylamine, 0 to 15 mole percent of a polyfunctional amine based on the total amine content, and epichlorohydrin, the amount of epichlorohydrin being from at least equimolar to the total amine content to about the full functional equivalency of the total amine content. The polymer should be water-soluble and have a molecular weight in the range of about 1,500 and 500,000, preferably about 10,000 to 200,000.

A second type of polycationic polymer is one consisting of repeating units of dimethyldiallylammonium chloride as described in U.S. Pat. No. 3,288,770 issued Nov. 29, 1966 to Butler. This polymer is referred to as poly(dimethyldiallylammonium chloride) and should have a molecular weight in the range of about 1,500 and 500,000 preferably about 10,000 to about 200,000.

A third type of polycationic polymer is a quaternarized derivative of poly(dimethylaminoethylmethacrylate). This polymeric type is described in U.S. Pat. No. 2,892,822 issued June 30, 1959 to Gray et al. These polymers also should have molecular weights in the range of about 1,500 and 500,000 preferably about 10,000 to about 200,000.

A fourth type of polycationic polymer is poly[oxyethylene(dimethylimino)ethylene(dimethylimino)ethylene dichloride]. This polymer in a limited range of viscosities is described in U.S. Pat. No. 3,985,671 issued Oct. 12, 1976 to Clark. The polymer is obtained by reacting dimethylamine and ethylene dichloride. This polymer will also have a molecular weight in the range of about 1,500 and 500,000, preferably about 3,000 to 50,000.

Both the polyanionic and polycationic polymers should be water-soluble polymers which in admixture are soluble at the concentrations at which they are to be used. Generally, these polymers are available as concentrated aqueous solutions which can be conveniently mixed in proper amounts to form the compositions of the present invention as concentrates which are then readily diluted to the concentration of use. In preparing compositions of the present invention, the relative proportions of the two polymers employed will be such that the molar ratio of the polycationic polymer to the polyanionic polymer based on the average molecular weight of repeating units therein will be in the range of about 2:1 and about 25:1, preferably about 2:1 to 4:1. For example, in a polyanionic polymer composed of 90 mole percent of sodium acrylate units, MW=94, and 10 mole percent of acrylamide units, MW=71, the average molecular weight of the repeating unit will be 91.7. Similarly, the repeating unit of a polycationic polymer composed of the reaction product of dimethylamine and epichlorohydrin, the repeating unit will have a molecular weight of 137.5.

The mixed polymer composition of the present invention, as indicated, is useful in inhibiting scale or sludge formation in evaporative desalination units. The composition is accordingly added to the water being processed in an amount effective in such inhibition. The specific amount useful in any given instance will vary widely depending upon the nature of the water being processed, the conditions of operation of the desalination units, the nature of the mixed polymer composition employed, and the like. Therefore, it is not possible to indicate a precise range of effective dosage that will cover all variables. However, an effective dosage will generally be found in the range of about 0.1 and 100 parts polymer mixture per million parts of water being processed. The specific amount for any particular system can readily be determined using the suggested range as a guide. The polymer mixture in such amount is added to the water to be processed.

The invention is more fully illustrated by the examples which follow wherein all parts and percentages are by weight unless otherwise specified.

Since the evaluation of scale inhibitors in commercial type desalination units involves large quantities of chemical additives, copious quantities of process water, considerable expenditures of power to effect evaporation, and extended time periods of operation, it is desirable to employ a small-size laboratory screening method whereby the suitability of proposed additives can be predicted with accuracy. The following laboratory method was employed in some of the examples which follow and subsequent large-size evaluations on commercial type equipment verified the accuracy of its predictions.

Laboratory Procedure

1. To a 150 milliliter (ml) capacity beaker containing 68 mls. of deionized water and added 5.4 ml of 0.10 N sodium hydroxide.
2. To the solution obtained above are added 5 ml of a 900 parts per million (ppm) stock solution of the agent of test, giving 50 ppm on the final contents of the beaker.
3. After thoroughly mixing the resulting composition, 11.55 ml of magnesium stock solution (6.0 grams Mg(NO$_3$)$_2$ 6H$_2$O in 1 liter of water) are added and heating of 90° C. with stirring is effected.

4. The beaker is then removed from the heat source and allowed to cool at ambient conditions.

A blank, no additive employed, run in this manner shows a white floc of hydrated magnesia which settles out in about twenty minutes. Ineffective scale inhibitors will have little or no effect on the rate of settling of hydrated magnesia. Effective scale inhibitors show significant increase is settling time of hydrated magnesia.

Following the Laboratory Procedure and using as the polyanionic polymer a copolymer of 90 mole percent acrylic acid and 10 mole percent of acrylamide having a molecular weight of about 1,000, the following polycationic polymers were found to provide polymer mixtures of ineffective scale inhibiting properties at any molar ratio of polycationic polymer to polyanionic polymer:

Melamine-formaldehyde acid colloids
Mannich bases of polyacrylamide
Polyethylenimines
Cationic starches
Polyamines obtained by condensation of ammonia and ethylenedichloride
Polymeric reaction products of methylamine and epichlorohydrin.

Using the same polyanionic polymer, polymeric condensates of alkylenediamines and dicarboxylic acids, a nonionic polymer, in admixture therewith did not provide effective scale inhibition. Using as the polycationic polymer, the reaction product of dimethylamine and epichlorohydrin and as the polyanionic polymer a polyaminoalkylenephosphonate described in U.S. Pat. No. 3,985,671, an ineffective scale inhibitor was obtained. Thus, numerous combinations of polyanionic and polycationic polymers are ineffective as scale inhibitors and it is surprising that the specific combinations of the present invention should be effective scale inhibitors.

EXAMPLE 1

Using the Laboratory Procedure described above, the following run was made. The polyanionic polymer was a 50 weight percent aqueous solution of a copolymer of 90 mole percent acrylic acid units in the form of the sodium salt and 10 mole percent of acrylamide units, the molecular weight being about 1,000. The polycationic polymer was a 50% aqueous solution of the reaction product of an amine composition consisting of 98 mole percent of dimethylamine and 2 mole percent of ethylenediamine with an amount of epichlorohydrin equal to the full functionality of the two amines, the product having a molecular weight of about 10,000. The mole ratio of polycationic polymer to polyanionic polymer was 2:1, and was obtained by adding three parts of the polycationic polymer to one part of the polyanionic polymer. A free-flowing homogeneous composition dilutable with water in all proportions was obtained. Evaluation of this composition as described in the Laboratory Procedure resulted in the prevention of magnesium hydroxide floc for 5 days.

EXAMPLE 2

Again following the Laboratory Procedure, another polymer composition was evaluated. The anionic polymer was that used in Example 1. The cationic polymer was the polyquaternary polymer obtained by reacting an amine mixture of 94 mole percent dimethylamine and 6 mole percent of ethylenediamine with an amount of epichlorohydrin equal to the full functionality of the two amines employed, the molecular weight of the polymer being 50,000. Both polymers were in the form of 50% aqueous solution and by mixture of one part of polyanionic polymer and three parts of polycationic polymer, the mole ratio of polycationic to polyanionic polymer was 2:1, based on the molecular weight average of the repeating units. The resulting composition was viscous, but homogeneous and dilutable with water in all proportions. This composition also prevented magnesium hydroxide floc formation for five days in the laboratory test.

Comparative Example A

An evaporative desalination unit operating at atmospheric pressure was run with sea water employing no additive to control scale formation. After approximately 24 hours of operation, heat transfer efficiency was lost due to magnesium scale formation and operation had to be stopped to remove the scale formation.

Comparative Example B

Using a desalination unit as in Comparative Example A, a polycationic polymer, which was the reaction product of a mixture of 98 mole percent of dimethylamine, 2 mole percent of ethylenediamine, and an amount of epichlorohydrin equal to the full functional equivalency of the two amines employed and of molecular weight 10,000, was added to the sea water being processed in the amount of 20 parts per million. After approximately 19 hours of operation, heat transfer efficiency was lost due to magnesium scale formation and operation had to be stopped to remove the scale formation.

Comparative Example C

The procedure of Comparative Example B was followed except that instead of polycationic polymer employed therein, there was employed at 20 ppm a polyanionic polymer which was a copolymer of 90 mole percent of acrylic acid units in the form of the sodium salt and 10 mole percent of acrylamide units, the molecular weight being about 1,000. Operation of the desalination unit had to be stopped after about 48 hours due to plugging with magnesium hydroxide flocs.

EXAMPLE 3

The composition described in Example 1 was added to the sea water being processed in a desalination unit as used in Comparative Example A in the amount of 20 ppm total polymer content. Heat transfer efficiency was maintained without the formation of scale or sludge for at least 110 hours. Compared to the result obtained in Comparative Example A, this represents an improvement in operating time of about 450%.

EXAMPLE 4

The procedure of Example 3 was repeated in all essential details except that the composition of Example 2 was employed instead of the composition of Example 1. In this run, the desalination unit operated for at least 164 hours without significant loss of heat transfer efficiency due to formation of scale or sludge. This represents an improvement in operating time of about 650% compared to the result of Comparative Example A.

Comparing the results obtained in Examples 3 and 4 with those obtained in Comparative Examples B and C, it can be seen that compositions of the present invention provide results that are significantly better than those obtained using either the polycationic polymer or the polyanionic polymer alone at equal dosage levels.

EXAMPLE 5

The Laboratory Procedure was again followed using the polyanionic polymer of Example 1 but substituting for the polycationic polymer therein a poly(dimethyldiallylammonium chloride) having a molecular weight of about 100,000, which was supplied in the form of a 20 weight percent aqueous solution, the molar ratio of polycationic polymer to polyanionic polymer being 2:1 based on the average molecular weight of the repeating units of the polymers. The proportions of the mixture were one part of polyanionic polymer and 4.35 parts of polycationic polymer. A homogeneous solution was obtained which was dilutable with water in all proportions and was effective as a scale inhibitor in the Laboratory Procedure.

EXAMPLE 6

The procedure of Example 1 was followed in every material detail except that the polyanionic polymer had a molecular weight of 8,000. An effective scale inhibitor composition was obtained based on the results of the Laboratory Procedure.

EXAMPLE 7

The procedure of Example 1 was again followed in every material detail except that the polycationic polymer was a homopolymer of dimethylaminoethyl methacrylate quaternarized with dimethyl sulfate and having a molecular weight of about 500,000. The proportions of polymers used was such as to provide a molar ratio of polycationic polymer to polyanionic polymer of 3:1 based on the average molecular weights of the separating polymer units. The composition was an effective scale inhibitor based on the Laboratory Procedure.

EXAMPLE 8

The procedure of Example 1 was again followed except that in place of the polycationic polymer used therein there was employed a poly[oxyethylene(dimethylimino)ethylene (dimethylimino)ethylene dichloride] of molecular weight of about 3,400. The proportions of polymers were such as to provide a molar ratio of polycationic polymer to polyanionic polymer of 4:1 based on the average molecular weight of the repeating units. The composition was an effective scale inhibitor based on the Laboratory Procedure.

EXAMPLE 9

The procedure of Example 1 was agian followed except that in place of the polyanionic polymer used therein there was employed an equivalent amount of a homopolymer of acrylic acid of molecular weight 2,500 as the sodium salt, thus providing a molar ratio of polycationic polymer to polyanionic polymer of 2:1 based on the average molecular weights of the repeating units. The composition was an effective scale inhibitor based on the Laboratory Procedure.

EXAMPLE 10

The procedure of Example 1 was again followed except that in place of the polyanionic polymer used therein there was employed an equal amount of a homopolymer of acrylic acid of molecular weight 1,000 in the form of the free acid radical. The mole ratio of polycationic polymer to polyanionic polymer was 2.3:1 based on the average molecular weight of the repeating polymer units. The composition was an effective scale inhibitor by the Laboratory Procedure.

EXAMPLE 11

The procedure of Example 1 was again followed except that in place of the polycationic polymer used therein there was employed a polycationic polymer obtained by reacting equal molar amounts of dimethylamine and epichlorohydrin, the polymer having a molecular weight of about 5,000. The ratio of polycationic polymer to polyanionic polymer was 2.1:1 based on the average molecular weights of the repeating polymer units. The composition was an effective scale inhibitor based on the Laboratory Procedure.

I claim:

1. A magnesium scale inhibiting composition comprising (1) a polyanionic polymer containing at least about 50 mole percent of repeating units derived from an acrylic acid and any balance of repeating units derived from one or more monomers compatible therewith, the acid units being in the form of at least one member selected from the group consisting of free acid radical, ammonium salts, and alkali metal salts, and (2) a polycationic polymer constituting the reaction product of dimethylamine-polyamine-epichlorohydrin wherein the amount of said polyamine is from 0 to about 15 mole percent of the total amine content and the amount of said epichlorohydrin is from at least the molar equivalent of the total amine content up to the full functional equivalent of said amine content, said polyanionic polymer having a molecular weight in the range of about 500 and 50,000, said polycationic polymer having a molecular weight in the range of about 1,500 to about 500,000, and the molar ratio of said polycationic polymer to said polyanionic polymer based on the average molecular weight of the repeating units therein being in the range of about 2:1 to 25:1.

2. The composition of claim 1 wherein said molar ratio is in the range of about 2:1 and 4:1.

3. The composition of claim 1 wherein the polycationic polymer is the reaction product of dimethylamine and epichlorohydrin in equal molar amounts.

4. The composition of claim 1 wherein the polycationic polymer has a molecular weight in the range of about 10,000 and 500,000.

5. The composition of claim 1 wherein the polyanionic polymer contains at least 10 mole percent of acrylamide units.

6. The composition of claim 5 wherein the polyanionic polymer has a molecular weight of about 1,000.

7. The composition of claim 5 wherein the polyanionic polymer has a molecular weight of about 8,000.

* * * * *